United States Patent
Hankendi et al.

(10) Patent No.: US 10,168,762 B2
(45) Date of Patent: Jan. 1, 2019

(54) POWER MANAGEMENT FOR HETEROGENEOUS COMPUTING SYSTEMS

(71) Applicant: Advanced Micro Devices, Inc., Sunnyvale, CA (US)

(72) Inventors: Can Hankendi, Sunnyvale, CA (US); Manish Arora, Sunnyvale, CA (US); Indrani Paul, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 253 days.

(21) Appl. No.: 14/857,574

(22) Filed: Sep. 17, 2015

(65) Prior Publication Data
US 2017/0083077 A1 Mar. 23, 2017

(51) Int. Cl.
*G06F 1/32* (2006.01)

(52) U.S. Cl.
CPC .......... *G06F 1/3287* (2013.01); *G06F 1/3206* (2013.01); *G06F 1/329* (2013.01); *G06F 1/3234* (2013.01); *Y02B 60/1282* (2013.01); *Y02B 60/144* (2013.01); *Y02D 10/171* (2018.01); *Y02D 10/24* (2018.01)

(58) Field of Classification Search
None
See application file for complete search history.

(56) References Cited

U.S. PATENT DOCUMENTS

| | | | | |
|---|---|---|---|---|
| 7,281,146 B2* | 10/2007 | Nalawadi | ............. | G06F 1/3203 713/320 |
| 8,032,767 B2* | 10/2011 | Belady | .................... | G06F 1/206 713/300 |
| 8,595,515 B1* | 11/2013 | Weber | .................. | G06F 1/3206 713/300 |
| 8,635,625 B2* | 1/2014 | Hanson | ................ | G06F 1/3203 718/100 |
| 2006/0080076 A1* | 4/2006 | Lahiri | ................ | G06F 17/5022 703/18 |
| 2006/0288241 A1* | 12/2006 | Felter | .................... | G06F 1/3203 713/300 |
| 2007/0005994 A1* | 1/2007 | Bahali | .................. | G06F 1/3203 713/300 |
| 2008/0234873 A1* | 9/2008 | Gorbatov | ............... | G06F 1/206 700/291 |

(Continued)

OTHER PUBLICATIONS

Ramya Raghavendra et al., "No 'Power' Struggles: Coordinated Multi-level Power Management for the Data Center", ACM SIGARCH Computer Architecture News, Mar. 1, 2008, pp. 48-59.

(Continued)

*Primary Examiner* — Nitin C Patel

(57) ABSTRACT

A computing system includes a set of computing resources and a datastore to store information representing a corresponding idle power consumption metric and a corresponding peak power consumption metric for each computing resource of the set. The computing system further includes a controller coupled to the set of computing resources and the datastore. The controller is to configure the set of computing resources to meet a power budget constraint for the set based on the corresponding idle power consumption metric and the corresponding peak power consumption metric for each computing resource of the set.

17 Claims, 3 Drawing Sheets

(56) References Cited

U.S. PATENT DOCUMENTS

| | | | | |
|---|---|---|---|---|
| 2008/0301473 | A1* | 12/2008 | Perez | G06F 1/3203 |
| | | | | 713/300 |
| 2011/0173475 | A1* | 7/2011 | Frantz | G06F 1/3203 |
| | | | | 713/323 |
| 2012/0005683 | A1* | 1/2012 | Bower, III | G06F 9/5094 |
| | | | | 718/103 |
| 2012/0137158 | A1* | 5/2012 | Nelluri | G06F 1/3203 |
| | | | | 713/340 |
| 2013/0159693 | A1* | 6/2013 | Francois | G06F 9/44505 |
| | | | | 713/100 |

OTHER PUBLICATIONS

Jason Mars et al., "Whare-Map: Heterogeneity in 'Homogeneous' Warehouse-Scale Computers", Proceedings of the 40th Annual International Symposium on Computer Architecture, Jun. 23, 2013, pp. 619-630.

Xiaobo Fan et al., "Power provisioning for a warehouse-sized computer" Proceedings of the 34th Annual International Symposium on Computer Architecture, Jun. 8, 2007, pp. 13-23.

Ripal Nathuji et al, "VPM tokens: virtual machine-aware power budgeting in datacenters", Cluster Computing, Jan. 23, 2009, pp. 189-203.

M. Etinski et al., "Optimizong job performance under a given power constraint in HPC centers", Green Computing Conference, Aug. 15, 2010, pp. 257-267.

\* cited by examiner

POWER MANAGEMENT FOR HETEROGENEOUS COMPUTING SYSTEMS

BACKGROUND

Field of the Disclosure

The present disclosure relates generally to large-scale computing systems and, more particularly, to power management in large-scale computing systems.

Description of the Related Art

The costs and technical difficulties of distributing sufficient power among the servers of a data center, along with the corresponding cooling requirements, have given rise to power management systems that seek to maintain a specified power budget or thermal envelope through server consolidation, job migration, and power capping. However, conventional approaches to power management assume a homogeneous system, that is, that servers of the same type or class exhibit the same power dynamics. This assumption, and the power management approaches it encourages, often leads to sub-optimal processing performance for a given power budget.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF ONE OR MORE EMBODIMENTS

Heterogeneity in the power dynamics of individual servers (despite apparent homogeneity in the components or configuration of those servers), racks of servers, and aisles of server racks is the reality of data center operation, even with seemingly homogenous use of similar machines. Various factors contribute to the different power dynamics among individual servers or groups of servers. For one, process variations often result in power performance variations on the order of 10-20% for the same part number or model number. Because of socket compatibility, different part models, with different power dynamics, may be used in seemingly identical machines. Some servers may have different system memory or local storage capacities than others due to failures, which in turn can impact per-watt performance. Further, components tend to exhibit changes in performance as they age, and thus the difference in ages of parts among the servers can contribute to differences in power consumption. Moreover, heterogeneity in server power dynamics may also occur for reasons external to the servers themselves, such as due to individual differences in fan power performance, or the typical differences in cooling efficacy in different regions of the data center.

Figure 1:
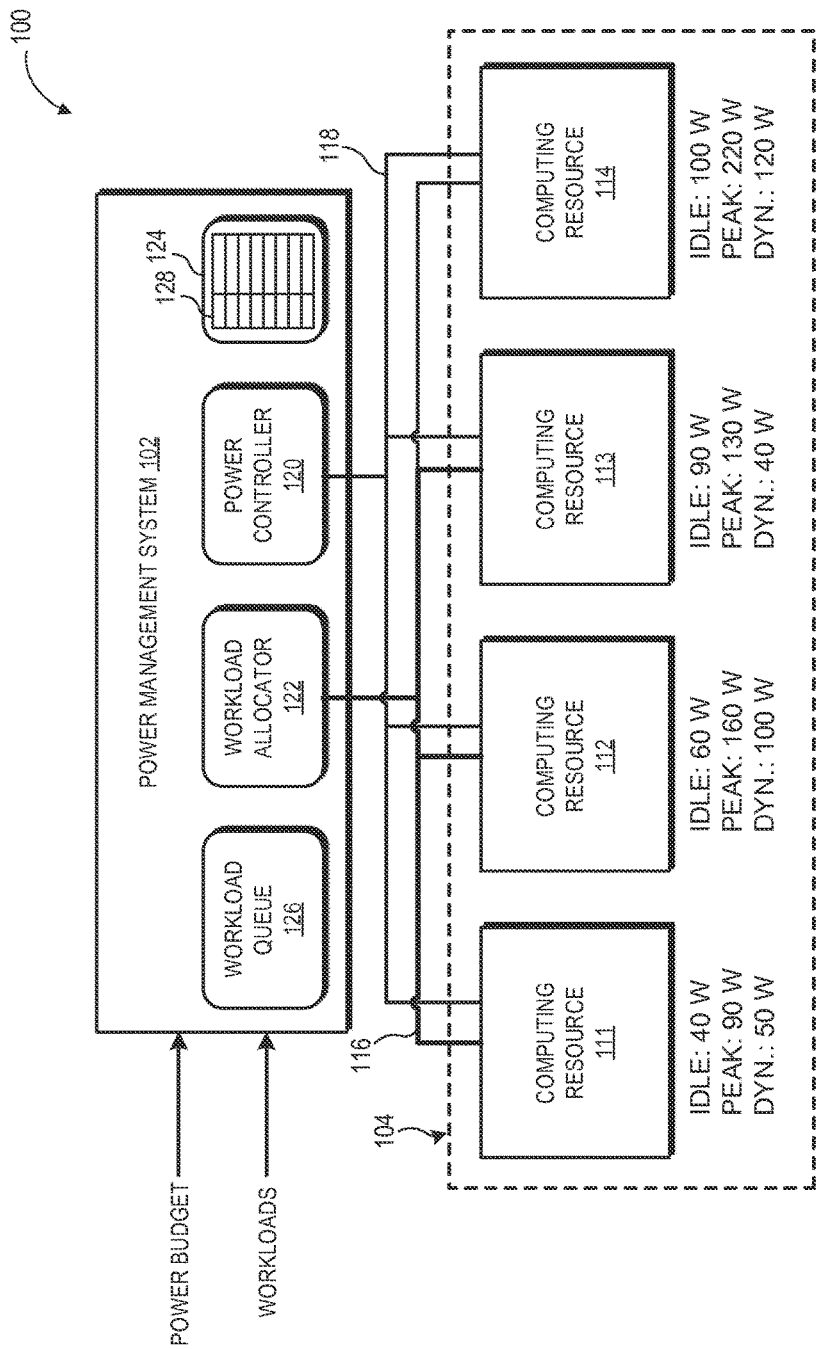
FIG. 1 is a block diagram of a data center utilizing a heterogeneous-aware power management system in accordance with some embodiments.
Figure 2:
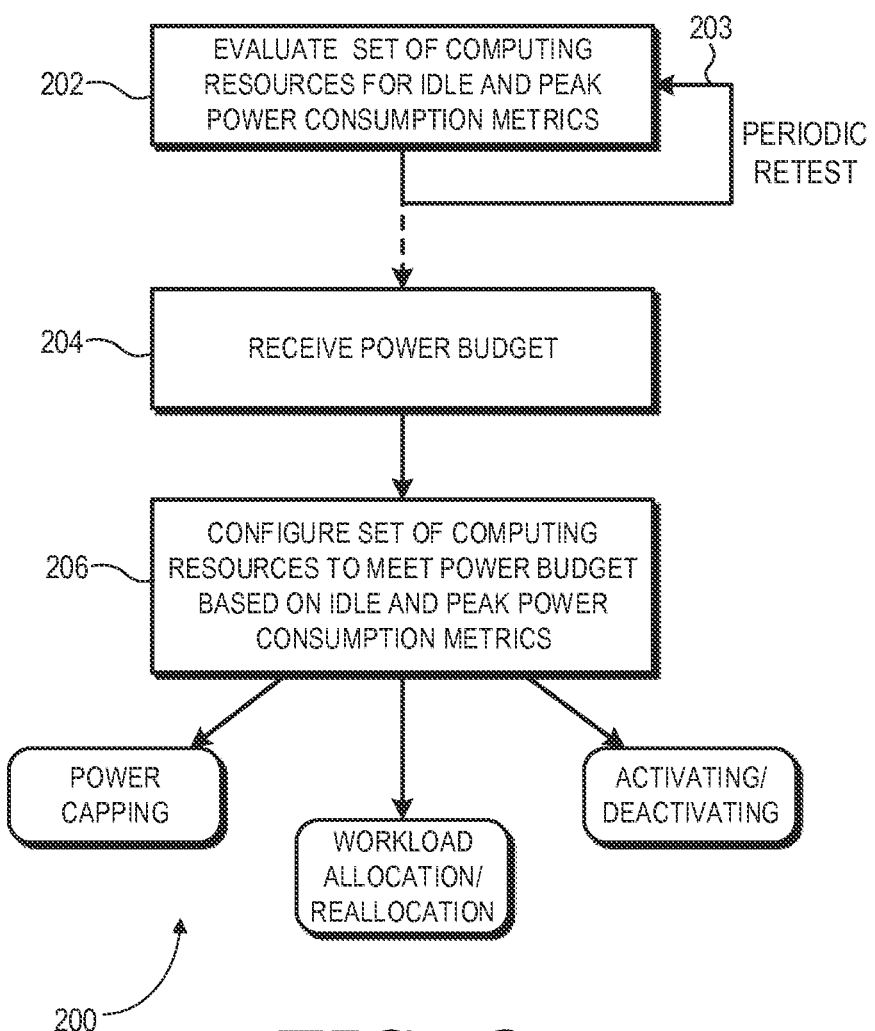
FIG. 2 is a flow diagram illustrating a method for power management in a data center based on per-server power dynamics in accordance with some embodiments.
Figure 3:
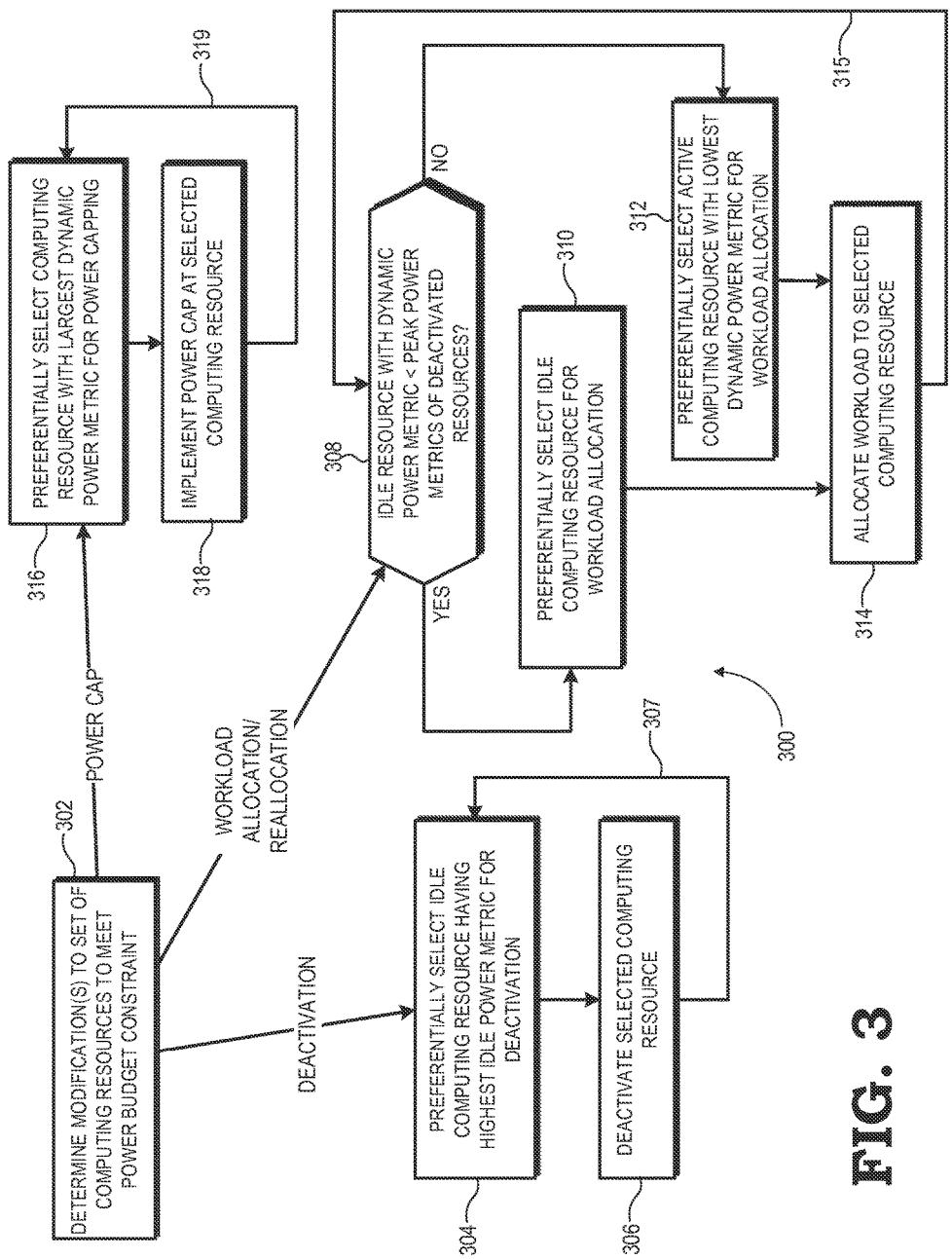
FIG. 3 is a flow diagram illustrating a method for implementing various power management configurations in a data center based on per-server power dynamics in accordance with some embodiments.

FIGS. 1-3 disclose techniques to account for the heterogeneous power dynamics of computing resources in a data center so as to more efficiently implement various power management schemes. In at least one embodiment, each computing resource of a set of computing resources is evaluated to determine a corresponding idle power consumption metric and a peak power consumption metric for the computing resource. The computing resources may be individual servers, or groups of servers, such as a rack of servers, an aisle of racks, a larger subsection of the datacenter, and the like. The evaluation of each computing resource can include testing (one more times) of the computing resource, or determination of the power consumption metrics from documentation provided by the supplier of the computing resource. A dynamic power consumption metric, represented by the difference between the peak power consumption metric and the idle power consumption metric, also is determined for each computing resource of the set (one or more times). These power consumption metrics then are used by a power management system to configure the set of computing resources to more efficiently meet a specified power budget constraint, which may represent a maximum power consumption allocated to the set of computing resources, a maximum thermal envelope allocated to the set of computing resources, or a combination thereof. The techniques employed by the power management system may include, for example, server consolidation based on idle power consumption metrics, workload allocation or reallocation based on peak power consumption metrics and dynamic power consumption metrics, power capping based on dynamic power consumption metrics, and the like.

For ease of illustrations, the power management techniques are described below generally in the example context of computing resources as individual servers. However, the described techniques are not limited to this example, but instead may be employed for groups of servers at various granularities, such as on a per-rack basis, per-aisle basis, per-group-of-aisles basis, and the like.

FIG. 1 illustrates a data center 100 employing heterogeneous-aware power management schemes in accordance with some embodiments. The data center 100 includes a power management system 102 and one or more sets 104 of two or more computing resources. For the depicted example, the set 104 includes four computing resources: computing resources 111, 112, 113, and 114 (collectively, "computing resources 111-114"). However, the number of computing resources in a set may be fewer or greater than the four described. In the event that the power management system 102 includes multiple sets 104, each set 104 may have the same number of computing resources or the sets 104 may have different numbers of computing resources.

As each computing resource is a server in this example, each computing resource includes one or more motherboards comprising one or more processing units connected to the motherboard via a corresponding socket, system memory, one or more disk drives or other local storage devices, a network interface card, and the like. The power management system 102 is connected to each of the computing resources via one or more data networks 116, such as an Ethernet network, used for communicating workload information and data between the power management system 102 and the computing resources, as well as among the computing resources. The power management system 102 further is connected to the computing resources via a control network 118 that is used to signal power configuration control information between the power management system 102 and the computing resources. In one embodiment, the control network 118 is implemented as part of the data network 116, while in other embodiments the control network 118 is implemented as a side-band network.

The power management system 102 includes a power controller 120, a workload allocator 122, a datastore 124, and a workload queue 126. The power controller 120 and workload allocator 122 may be implemented as hard-coded logic, such as one or more application specific integrated circuits (ASICs), field programmable gate arrays (FPGAs), and the like, as one or more processors executing software stored in a non-transitory computer readable medium, such as a read only memory (ROM) or disk drive, or combinations thereof. To illustrate, in some embodiments, the power controller 120 and workload allocator 122 are at least partially implemented as modules of a larger software program or operating system that is executed by one or more processors of a stand-alone computing system implemented in the datacenter 100 as the power management system 102.

The workload allocator 122 operates to receive processing workloads (also commonly referred to as "jobs") from a workload scheduler (not illustrated in FIG. 1) and buffer the workloads in the workload queue 126. The workload allocator 122 then operates to schedule and allocate workloads from the workload queue 126 to the computing resources 111-114 of the set 104 based on input from the power controller 120, as well as reallocate workloads between the computing resources 111-114 based on input from the power controller 120. The power controller 120 operates to receive power budget information from, for example, a central power management system (not shown) for the entire datacenter 101, and then to configure the computing resources 111-114 so as to meet one or more power budget constraints represented by the power budget information in a manner that reduces the impact on system performance.

The computing resources 111-114 exhibit heterogeneous power dynamics due to any of a variety of factors, such as process variation and age variation in the components of the computing resources, variation in cooling efficacy at the different locations of the computing resources, and the like. Thus, while each of the computing resources 111-114 may comprise a server of the same or similar make, each of the servers operates with a different idle power consumption metric and a different peak power consumption metric. The idle power consumption metric (also referred to herein as the "idle power metric" for brevity) of a computing resource represents the power consumed by the computing resource when powered up and executing only non-workload processes, such as an the operating system, a virtual machine manager, and background processes. The peak power consumption metric (also referred to herein as the "peak power metric" for brevity) of a computing resource represents the power consumed by the computing resource when powered up and executing workload processes at full capacity. The difference between the peak power metric and the idle power metric for a computing resource is referred to herein as the "dynamic power consumption metric" (or "dynamic power metric" for brevity), and thus represents the additional power consumed by a computing resource when fully engaged compared to when it is idle. To illustrate, in the example of FIG. 1, the power metrics of the computing resources 111-114 in units of watts (W) are represented by the following table:

TABLE 1

Example Power Dynamic power metrics for Set 104

| RESOURCE | IDLE | PEAK | DYNAMIC | CLASS |
|---|---|---|---|---|
| Resource 111 | 40 W | 90 W | 50 W | Low Idle-Low Dynamic |
| Resource 112 | 60 W | 160 W | 100 W | Low Idle-High Dynamic |
| Resource 113 | 90 W | 130 W | 40 W | High Idle-High Dynamic |
| Resource 114 | 100 W | 220 W | 120 W | High Idle-High Dynamic |

As will be appreciated by those of ordinary skill in the art, the values of Table 1 may change over time due to, for example (and as mentioned earlier) changes in the age of the computing resources, due to individual differences in fan power performance, or the typical differences in cooling efficacy in different regions of the data center). In at least one embodiment, the power controller 120 implements power management schemes based on information regarding this heterogeneity of power dynamics among the computing resources 111-114 of the set 104. That is, the power controller 120 implements "heterogeneous-aware" power management techniques that account for the different power dynamics so as to more efficiently meet one or more specified power budget constraints in a manner that preserves processing capacity more effectively than conventional approaches that assume homogeneous power dynamics among servers of similar make.

FIG. 2 illustrates an example method 200 of operation of the power management system 102 in the data center 100 of FIG. 1 to implement such heterogeneous-aware power management schemes in accordance with some embodiments. In order to implement the power management scheme, the power management system 102 should understand the power dynamics of the individual computing resources. Accordingly, at block 202 the computing resources 111-114 are evaluated to determine their power metrics. In some implementations, the power metrics may be determined from datasheets or other documentation provided by a manufacturer or supplier of the computing resources, or components thereof. In such instances, the power metrics may be manually or automatically extracted from this information, formatted in a specified configuration (e.g., a look-up table or other data structure), and stored as power dynamic information 128 (FIG. 1) in the datastore 124. In other implementations, the power controller 120 of the power management system 102 may test some or all of the computing resources 111-114 to determine their individual power metrics.

To illustrate, the power controller 120 may control a computing resource, through the workload allocator 122, so that the computing resource is not assigned any workloads to process during the test period. The power controller 120 may then coordinate with a power monitor (not shown in FIG. 1) at a power input of the computing resource to determine the power consumption of the computing resource during this idle test period. The idle power consumption determined in this process may then be converted to an idle power metric with a specified format and then stored to an entry in the power dynamic information 128 in the datastore 124 corresponding to the computing resource. The power controller 120 then may introduce one or more workloads (using, e.g., a power virus) that fully engage the processing power of the computing resource, and then use the power monitor to determine the power consumption of the computing resource during this peak performance period. The resulting peak power consumption then may be converted to a peak power metric and stored in the power dynamic information 128 in the datastore 124 in the entry associated with the computing resource. The power controller 120 then may subtract the idle power metric from the peak power metric to determine a dynamic power metric for the computing resource, which is then stored in the power dynamic information 128. As mentioned above, this idle and peak power testing may be performed periodically so as to update the values represented in Table 1, above.

As noted above, the power dynamics of a particular computing resource may be affected by a number of factors, some of which may change over time. For example, the cooling efficacy in the area of the computing resource may improve or degrade as updates or modifications to the cooling system occur. Likewise, failures in the system memory and local disk storage also can impact the per-watt performance of the computing resource. Further, as the computing resource ages, it typically experiences changes in its power dynamics. Accordingly, as represented by return path 203, in at least one embodiment the power controller 120 periodically retests the computing resources to update their power metrics stored in the power dynamic information 128 in the datastore 124.

With the power dynamics of the computing resources 111-114 so characterized, the power management system 102 is prepared to implement power management techniques based on the individual power dynamics of the computing resources 111-114. To that end, at block 204 the power management system 102 receives power budget information representing one or more power budget constraints to be implemented for the next computing epoch of the set 104 of computing resources. In some implementations, the power budget constraints can represent a total power budget or total thermal envelope limit for the set 104 for the upcoming epoch, and the power management system 102 is left to determine the configuration of the computing resources 111-114 that best utilizes this power budget constraint. In other implementations, the power budget constraints can represent a proportional change in the power budget for the set 104. To illustrate, a datacenter-wide controller may send out the same directive to every power management subsystem to reduce the power budget by 10% from the previous epoch, in which case the power management system 102 must implement a power cap of 10% for the upcoming epoch.

With one or more power budget constraints specified for the upcoming epoch, at block 206 the power management system 102 determines a configuration of the computing resources 111-114 of the set 104 to meet the one or more power budget constraints while limiting the processing efficiency impact by taking the heterogeneity of the power dynamics of the computing resources 111-114 into account. The configuration of the computing resources 111-114 can include, for example, a power capping scheme whereby one or more computing resources 111-114 are selected for power capping to reduce their power consumption and thus the overall power consumption for the set 104. The configuration can include, for example, a selective workload allocation that seeks to allocate new workloads to the computing resources that can most efficiently process the workloads, or the reallocation of workloads already underway from less efficient computing resources to more efficient resources. This job allocation process may include activating (that is, powering up) previously deactivated computing resources that have lower peak power metrics, or deactivating (that is, powering down) previously active computing resources having higher peak power metrics and migrating their workloads to other computing resources that have lower peak power metrics. Configuration of the computing resources also can include selectively deactivating (that is, powering down) computing resources so that their idle power consumption does not subtract from the power budget constraint for the entire set 104. Further, in some embodiments, the configuration implemented by the power management system 102 may include a combination of these heterogeneous-aware techniques to meet the specified power budget restraints.

FIG. 3 illustrates an example method 300 employed by the power management system 102 for implementing a heterogeneous-aware configuration for the set 104 of computing resources in accordance with at least one embodiment. As noted above with reference to block 204 of FIG. 2, the power management system 102 receives power budget information representing one or more power budget constraints, and at block 206 of FIG. 2, the power controller 120 of the power management system 102 configures the set 104 of computing resources to meet the one or more power constraints. To this end, at block 302, the power controller 120 determines one or more modifications to the current configuration of the set 104 to make for the upcoming computing epoch. The power controller 120 can use any of a variety of algorithms to determine the modifications to be implemented, and the particular algorithm utilized typically will be specific to the particular configuration of the datacenter 100 and the prioritization of goals of the datacenter 100, such as how much emphasis is to be placed on maximizing processing performance, whether power budgets may be temporarily exceeded, and the like. As described above, various power management techniques, and combinations thereof, may be employed to meet a power budget constraint, and some or all of these power management techniques may rely on an understanding of the different power dynamics of different computing resources within the set 104.

To illustrate, at block 302 the power controller 120 may determine that server consolidation is to be employed for the next computing epoch to meet a specified power budget constraint. In particular, the power controller 120 may seek to deactivate one or more of the computing resources that are idle, or will be idle, so that the power that otherwise would be consumed by the deactivated computing resources will not contribute to the overall power consumption of the set 104. To this end, at block 304 the power controller 120 identifies those computing resources of set 104 that will be idle in the upcoming epoch, identifies the idle power metric of each computing resource of this subset, and preferentially selects the idle computing resource having the highest idle power metric for deactivation during the upcoming epoch. However, in some instances, there may be other considerations when selecting a computing resource to deactivate, such as the power consumed to bring the computing resource back online once it is to be reactivated. Accordingly, while preference is given to selecting the idle computing resource with the highest idle power metric all other relevant factors being equal, the other factors may override this preference, and result in the selection of a different idle computing resource. When the power controller 120 has selected an idle computing resource to deactivate based on idle power metrics, as well as other considerations, at block the power controller 120 signals the selected computing resource to deactivate at the appropriate time via the control network 118. As represented by return path 307, this process may be repeated one or more times to deactivate additional idle computing resources.

To illustrate using the example represented by Table 1 above, assume that computing resources 112 and 114 constitute the subset of computing resources that are to be idle during the upcoming epoch. As the computing resource 112 has an idle power metric of 60 W while the computing resource 114 has an idle power metric of 100 W, the power controller 120 would preferentially select the computing resource 114 for deactivation for the upcoming epoch.

Another modification selected by the power controller 120 can include workload allocation or workload reallocation so as to achieve improved power consumption for a given workload or set of workloads. Typically, this can be achieved by preferentially allocating workloads to an activated but idle computing resource than activating and running the same workload on a deactivated computing resource with a peak power metric that is higher than the dynamic power metric of the activated but idle computing resource. Accordingly, in the event that workload allocation/reallocation is a configuration modification selected by the power controller, at block 308 the power controller 120 identifies the subset of computing resources that are activated but idle and identifies the dynamic power metric of each computing resource in this subset. The power controller 120 also identifies the subset of computing resources that are deactivated and identifies the peak power metric of each computing resource in this other subset. From this information, the power controller 120 determines whether any of the activated but idle computing resources has a dynamic power metric that is lower than all of the peak power metrics of the deactivated computing resources. If so, at block 310 the power controller 120 preferentially selects this idle computing resource for allocation of one or more workloads from the workload queue 126 for the upcoming epoch. If not, at block 312 the power controller 120 identifies the deactivated computing resource with the lowest peak power metric and preferentially selects this deactivated computing resource for activation and allocation of one or more workloads from the workload queue 126 for the upcoming epoch.

The respective computing resources are preferentially selected in blocks 310 and 312 in that other factors may be involved in selecting the computing resource to be allocated workloads, and one or more of these factors may outweigh the preference arrived at through blocks 308, 310, and 312. To illustrate, it may be that the data set to be operated upon during execution of a workload is locally stored at one of the computing resources, and the time and power required to transfer this data set to another computing resource may override any efficiencies to be gained through heterogeneous-aware allocation policies. When the power controller 120 has selected a computing resource to receive a workload based on dynamic and peak power metrics, as well as other considerations, at block 314 the power controller 120 signals the selected computing resource to receive the workload at the appropriate time via the control network 118. As represented by return path 315, this process may be repeated one or more times to allocate additional workloads among the remaining computing resources.

To illustrate the workload allocation process of blocks 308-315 with reference to the example of Table 1, assume that computing resource 112 is tentatively scheduled to be active but idle for the upcoming epoch, whereas computing resource 113 is tentatively scheduled to be deactivated for the upcoming epoch. The dynamic power metric of idle computing resource 112 is 100 W, and thus it would cost 100 W of power to allocate a workload to the computing resource 112 for the upcoming epoch. In contrast, the peak power metric of deactivated computing resource 113 is 130 W, and thus it would cost 130 W of power to instead allocate the workload to the computing resource 113 for the upcoming epoch. Thus, all else being equal, the power controller 120 would allocate the workload the computing resource 112 instead of activating the computing resource 113 to receive the workload.

As another example using the Table 1, assume that computing resource 113 is tentatively scheduled to be active but idle for the upcoming epoch, whereas computing resource 112 is tentatively scheduled to be deactivated for the upcoming epoch. The dynamic power metric of idle computing resource 113 is 40 W, and thus it would cost 40 W of power to allocate a workload to the computing resource 113 for the upcoming epoch. In contrast, the peak power metric of deactivated computing resource 112 is 160 W, and thus it would cost 160 W of power to instead allocate the workload to the computing resource 112 for the upcoming epoch. Thus, all else being equal, the power controller 120 would allocate the workload the computing resource 113 instead of activating the computing resource 112 to receive the workload in this example.

The server consolidation process of blocks 304 and 306 and the allocation process of blocks 308-314 may be combined to implement a modification selected by the power controller 120 to deactivate an active computing resource and transfer the workloads currently assigned to the computing resource to one or more other computing resources. In this approach, the power controller 120 identifies whether any idle computing resources have a dynamic power metric lower than the peak power metrics of active computing resources, and if so, the power controller 120 selects the active computing resource with the highest peak power metric for deactivation and reallocates some or all of the workloads of the to-be-deactivated computing resource to the idle computing resource having the lower dynamic power metric. Alternatively, or in addition, the power controller 120 may identify whether any deactivated computing resources have a peak power metric lower than the peak power metrics of active computing resources, and if so, select the active computing resource with the highest peak power metric for deactivation and then activate the deactivated computing resource with the lowest peak power metric and reallocate the workloads of the to-be-deactivated computing resource to the to-be-activated computing resource.

Yet another modification selected by the power controller 120 can include power capping so as to reduce the power consumed by one or more active computing resources for a corresponding epoch. Due to the heterogeneity in the power dynamics of the computing resources of the set 104, a power cap of a certain wattage will impact the computing resources differently. To illustrate using the example of Table 1 above, because computing resource 112 has a dynamic power metric of 40 W whereas computing resource 113 has a dynamic power metric of 100 W, capping 10 W of power on computing resource 112 will result in a 25% performance loss but only a 10% performance loss if the 10 W power cap is applied instead to the computing resource 113 (assuming a roughly linear correlation between power and performance). As such, the power controller 120, in some embodiments, preferentially selects computing resources with higher dynamic power metrics over computing resources with lower dynamic power metrics for power capping of a fixed amount (compared to a proportional power cap). To this end, if a power cap modification is selected for implementation by the power controller 120, at block 316 the power controller 120 identifies the subset of computing resources of set 104 that are active, identifies the dynamic power metric for each computing resource of this subset, and then preferentially selects the computing resource of this subset that has the highest dynamic power metric for application of the power cap.

The preferential selection made at block 316 reflects that other considerations may impact the decision of which computer resource is power capped. To illustrate, a computing resource may be executing a high-priority workload and thus may be exempted from power capping, even though it may have the highest dynamic power metric. When a computing resource ultimately is selected by the power controller 120 based on the dynamic power metrics and whichever other factors may be involved, the power cap is applied to the selected computing resource at block 318. The power cap may be achieved using any of a variety of techniques. For example, in some embodiments, the power controller 120 may signal the selected computing resource to enter into a lower-power P-state or the power controller 120 may otherwise alter the voltage or clock frequency employed by the computing resource to reduce its overall power consumption. Another power capping technique employed by the power controller 120 can include the introduction of idle cycles into the workflow of the selected computing resource, thereby reducing the average power consumption of the computing resource over the corresponding epoch. Return path 319 reflects that the process of power capping represented by blocks 316 and 318 may be repeated one or more times for other active computing resources of the set 104.

In some embodiments, the apparatus and techniques described above are implemented in a system comprising one or more integrated circuit (IC) devices (also referred to as integrated circuit packages or microchips), such as the power management system 102 described above with reference to FIGS. 1-3. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a data center comprising a set of computing resources having heterogeneous power dynamics, a method comprising:
   determining a power cap for the set of computing resources based on a power budget constraint;
   configuring the set of computing resources having heterogeneous power dynamics to meet the power budget constraint for the set while limiting a processing efficiency impact, wherein configuring comprises:
      determining, for each active computing resource of the set, a dynamic power consumption metric based on a difference between a peak power consumption metric and an idle power consumption metric for the computing resource;

selecting the active computing resource having a highest dynamic power consumption metric for implementation of the power cap; and power capping the selected active computing resource based on the determined power cap.

2. The method of claim 1, wherein configuring the set of computing resources to meet the power budget constraint comprises:

identifying a first subset of computing resources of the set that are idle; and reducing a power consumption of the set by selecting for deactivation a computing resource of the first subset having the highest idle power consumption metric.

3. The method of claim 2, wherein configuring the set of computing resources to meet the power budget constraint further comprises:

identifying a second subset of computing resources of the set that are active;

determining, for each computing resource of the second subset, a dynamic power consumption metric based on a difference between the peak power consumption metric and the idle power consumption metric for the computing resource; and selecting for reallocation of one or more processing workloads from the selected computing resource of the first subset a computing resource of the second subset having the lowest dynamic power consumption metric.

4. The method of claim 1, configuring the set of computing resources to meet the power budget constraint further comprises:

identifying a first subset of computing resources of the set that are deactivated;

identifying a second subset of computing resources of the set that are idle;

determining, for each computing resource of the second subset, a dynamic power consumption metric based on a difference between the peak power consumption metric and the idle power consumption metric for the computing resource;

selecting for allocation of a processing workload a computing resource of the second subset responsive to determining that the computing resource of the second subset has a dynamic power consumption metric that is lower than the peak power consumption metrics of the computing resources of the first subset; and powering up and selecting for allocation of the processing workload a computing resource of the first subset responsive to determining that the computing resource of the first subset has a peak power consumption metric less than the dynamic power consumption metrics of the computing resources of the second subset.

5. The method of claim 1, further comprising:

testing each of the computing resources of the set using a power virus to determine the corresponding idle power consumption metric and the corresponding peak power consumption metric.

6. The method of claim 5, further comprising:

retesting each of the computing resources of the set to update the corresponding idle power consumption metric and the corresponding peak power consumption metric.

7. The method of claim 1, wherein each of the computing resources of the set comprises one of: an individual server of the data center; and a corresponding group of two or more servers of the data center.

8. A computing system comprising:

a set of computing resources with heterogeneous power dynamics;

a datastore to store information representing a corresponding idle power consumption metric and a corresponding peak power consumption metric for each computing resource of the set; and a controller coupled to the set of computing resources and the datastore, the controller to configure the set of computing resources to meet a power budget constraint for the set while limiting a processing efficiency impact, wherein the controller is to configure by:

determining a power cap based on the power budget constraint for the set of computing resources;

determining, for each active computing resource of the set, a dynamic power consumption metric based on a difference between the peak power consumption metric and the idle power consumption metric for the computing resource;

selecting the active computing resource having a highest dynamic power consumption metric for implementation of the power cap; and power capping the selected active computing resource based on the determined power cap.

9. The computing system of claim 8, wherein the controller is to configure the set of computing resources to meet the power budget constraint by:

identifying a first subset of computing resources of the set that are idle; and reducing a power consumption of the set by selecting for deactivation a computing resource of the first subset having the highest idle power consumption metric.

10. The computing system of claim 9, wherein the controller is to configure the set of computing resources to meet the power budget constraint further by:

identifying a second subset of computing resources of the set that are active;

determining, for each computing resource of the second subset, a dynamic power consumption metric based on a difference between the peak power consumption metric and the idle power consumption metric for the computing resource; and selecting a computing resource of the second subset having the lowest dynamic power consumption metric for reallocation of one or more processing workloads from the selected computing resource of the first subset.

11. The computing system of claim 8, wherein the controller is to configure the set of computing resources to meet the power budget constraint by:

identifying a first subset of computing resources of the set that are deactivated;

identifying a second subset of computing resources of the set that are idle;

determining, for each computing resource of the second subset, a dynamic power consumption metric based on a difference between the peak power consumption metric and the idle power consumption metric for the computing resource;

selecting for allocation of a processing workload a computing resource of the second subset responsive to determining that the computing resource of the second subset has a dynamic power consumption metric that is lower than the peak power consumption metrics of the computing resources of the first subset; and powering up and selecting for allocation of the processing workload a computing resource of the first subset responsive to determining that the computing resource of the first subset has a peak power consumption metric less than the dynamic power consumption metrics of the computing resources of the second subset.

12. The computing system of claim 8, wherein the controller further is to test each of the computing resources of the set to determine the corresponding idle power consumption metric and the corresponding peak power consumption metric.

13. The computing system of claim 12, wherein the controller further is to retest each of the computing resources of the set to update the corresponding idle power consumption metric and the corresponding peak power consumption metric.

14. The computing system of claim 8, wherein each of the computing resources of the set comprises an individual server of a data center.

15. The computing system of claim 8, wherein each of the computing resources of the set comprises a corresponding group of two or more servers of a data center.

16. The computing system of claim 15, wherein a group of two or more servers comprises one of: a server rack; an aisle of server racks; and a set of two or more aisles of server racks.

17. In a data center comprising a set of computing resources, a method comprising:

allocating a processing workload to a computing resource of the set of computing resources in a manner that limits a processing efficiency impact by:

selecting an active first computing hardware resource of the set over a deactivated second computing hardware resource for allocation of the processing workload responsive to determining a dynamic power consumption metric of the first computing hardware resource is less than a peak power consumption metric of the second computing hardware resource;

selecting the deactivated second computing hardware resource for activation and allocation of the processing workload responsive to determining the dynamic power consumption metric of the first computing hardware resource is greater than the peak power consumption metric of the second computing hardware resource; and selecting an active third computing hardware resource of the set of computing resources over the active first computing hardware resource and the deactivated second computing hardware resource for allocation of the processing workload responsive to determining a dynamic power consumption metric of the third computing hardware resource is less than the dynamic power consumption metric of the first computing hardware resource and less than the peak power consumption metric of the second computing hardware resource.

* * * * *